(12) United States Patent
Fukuda (10) Patent No.: US 9,269,008 B2
(45) Date of Patent: Feb. 23, 2016

(54) BIOMETRIC INFORMATION PROCESSING APPARATUS AND BIOMETRIC INFORMATION PROCESSING METHOD

(71) Applicant: FUJITSU LIMITED, Kawasaki-shi, Kanagawa (JP)

(72) Inventor: Mitsuaki Fukuda, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/573,655

(22) Filed: Dec. 17, 2014

(65) Prior Publication Data
US 2015/0193665 A1    Jul. 9, 2015

(30) Foreign Application Priority Data
Jan. 6, 2014  (JP) .................... 2014-000281

(51) Int. Cl.
| | |
|---|---|
| G06K 9/36 | (2006.01) |
| G06K 9/00 | (2006.01) |
| G06K 9/62 | (2006.01) |
| G06K 9/52 | (2006.01) |
| G06T 3/00 | (2006.01) |

(52) U.S. Cl.
CPC .............. *G06K 9/00885* (2013.01); *G06K 9/52* (2013.01); *G06K 9/6201* (2013.01); *G06T 3/0068* (2013.01)

(58) Field of Classification Search
None
See application file for complete search history.

(56) References Cited

U.S. PATENT DOCUMENTS

| | | | | |
|---|---|---|---|---|
| 2005/0025364 A1* | 2/2005 | Kim | ................... | G06K 9/00375 382/190 |
| 2005/0148876 A1* | 7/2005 | Endoh | ................... | A61B 5/117 600/454 |
| 2009/0174662 A1* | 7/2009 | Kato | ................... | G06F 3/03543 345/163 |
| 2011/0243396 A1* | 10/2011 | Hama | ................... | A61B 5/117 382/115 |
| 2014/0294251 A1* | 10/2014 | Jo | ....................... | G06K 9/00885 382/115 |
| 2015/0186708 A1* | 7/2015 | Katz | ................... | G06K 9/00087 382/115 |
| 2015/0213321 A1* | 7/2015 | Okazaki | ............. | G06K 9/00013 382/116 |

FOREIGN PATENT DOCUMENTS

| | | |
|---|---|---|
| JP | 2002-230553 | 8/2002 |
| JP | 2008-134854 | 6/2008 |

OTHER PUBLICATIONS

Otsu Nobuyuki, "An Automatic Threshold Selection Method Based on Discriminant and Least Squares Criteria", The IEICE Transactions (Japanese Edition)D, vol. J63-D No. 4, pp. 349-356, Apr. 25, 1980 Abstract.

* cited by examiner

*Primary Examiner* — Brian P Werner
(74) *Attorney, Agent, or Firm* — Staas & Halsey LLP (57) ABSTRACT

A biometric information processing apparatus includes an aligning unit that aligns a hand image in a first vein image that includes a vein pattern of one hand among a right hand and a left hand as seen from one side of a palm side of the hand or a back side of the hand, with a hand image in a second vein image that includes a vein pattern of the other hand among the right hand and the left hand as seen from the other side among the palm side of the hand or the back side of the hand; and a match determining unit that determines a line element, among a plurality of line elements in the first vein image, that matches any of a plurality of line elements in the second vein image.

10 Claims, 8 Drawing Sheets

BIOMETRIC INFORMATION PROCESSING APPARATUS AND BIOMETRIC INFORMATION PROCESSING METHOD

CROSS-REFERENCE TO RELATED APPLICATION

This application is based upon and claims the benefit of priority from the prior Japanese Patent Application No. 2014-000281 filed on Jan. 6, 2014, the entire contents of which are incorporated herein by reference.

FIELD

The embodiments discussed herein relate to a biometric information processing apparatus and a biometric information processing method.

BACKGROUND

Biometric authentication technologies have been disclosed recently to determine whether to authenticate a person by using biometric information such as fingerprints and vein patterns. Biometric authentication technologies are widely used for determining whether to allow access to various services such as determining permission to enter or exit a room, determining whether to allow use of a computer, or confirming users for online transactions and the like.

Fingerprints are known as an example of biometric information used for biometric authentication. However, there is a risk that biometric information exposed on the outer surface of a body such as fingerprints may be copied. Conversely, a biometric authentication technology that uses subcutaneous biometric information demonstrates excellent security since subcutaneous biometric information such as vein patterns is difficult to copy. Accordingly, a technique that uses vein patterns for biometric authentication has been proposed, see, for example, Japanese Laid-open Patent Publication 2008-134854.

SUMMARY

According to an aspect of the invention, a biometric information processing apparatus includes an aligning unit that aligns a hand image in a first vein image that includes a vein pattern of one hand among a right hand and a left hand as seen from one side of a palm side of the hand or a back side of the hand, with a hand image in a second vein image that includes a vein pattern of the other hand among the right hand and the left hand as seen from the other side among the palm side of the hand or the back side of the hand; and a match determining unit that determines a line element, among a plurality of line elements in the first vein image, that matches any of a plurality of line elements in the second vein image.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A vein pattern is displayed in an image obtained by irradiating a portion including vein pattern with light such as an infrared ray which has wavelengths passing through a human skin. Because the absorptivity of infrared rays in a portion through which a vein passes is higher than the absorptivity of infrared rays of a portion without a vein, the luminance value of pixels in regions in which the vein is reflected is lower than the luminance value of pixels in regions in which the vein is not reflected in the image. As a result, a biometric authentication device is able to specify a vein pattern by extracting from the image groups of pixels having lower luminance values than the luminance values of surrounding pixels.

However, when a hand vein pattern is used for biometric authentication, an image of wrinkles on the surface of the palm of the hand may be included with the vein pattern in the image when imaging the hand vein pattern. In this case, the luminance value of the pixels that reflect the wrinkles on the surface of the palm of the hand may be lower than the luminance value of the pixels that do not reflect the wrinkles. As a result, the pixels that reflect the wrinkles on the surface of the palm of the hand may be mistakenly extracted as pixels that reflect the veins when extracting the vein pattern from the image of the vein. Consequently, there is a possibility that the pattern of the wrinkles on the surface of the palm of the hand may become mixed with the vein pattern. When the pattern of wrinkles on the surface of the palm of the hand is mixed with the vein pattern extracted from the image of the hand vein pattern during registration or during verification, there is a fear that the authentication accuracy will be reduced. The reason for this is described below.

A pattern of wrinkles on the surface of the palm of the hand is typically referred to as the palm reading or the lines of the palm. It is well known that the lines of the palm include line elements of shapes that are similar in the relatively same positions in completely different persons such as the lines referred to as the Line of the Heart, the Knowledge line, and the Lifeline in palmistry. Therefore, when a pattern of wrinkles on the surface of the palm of the hand that is similar even among different people is mixed with the vein pattern extracted from an image to be used for biometric authentication processing, it may be difficult to discriminate between vein patterns of different persons during verification processing due to the influence of the pattern of wrinkles on the surface of the palm of the hand.

It is desired to provide a biometric information processing apparatus that is able to specify extracted line elements mistaken as veins from an image of hand veins.

Hereinbelow, a biometric information processing apparatus according to the embodiment will be explained with reference to the drawings. The inventor observed that while the vein patterns of the right and left hands are different in a user, the pattern of the wrinkles on the surface of the palm of the right hand and the pattern of the wrinkles on the surface of the palm of the left hand are relatively similar. That is, when either one of a right hand image and a left hand image obtained by imaging the same side of the right hand and the left hand is mirror-inverted and the hands in the images are aligned together, the patterns of the wrinkles on the surface of the palms of the right hand and the left hand include relatively many portions that match. Conversely, the vein pattern of the right hand and the vein pattern of the left hand include very few matches.

Accordingly, the biometric information processing apparatus makes an inverted-mirror image of either one of a vein image depicting the vein pattern of the right hand and a vein image depicting the vein pattern of the left hand, the vein images being imaged from the same side of the hands of the user, and then aligns the two vein images. The biometric information processing apparatus then extracts a plurality of line elements each depicted by one line as vein candidates from the respective vein images. The biometric information processing apparatus specifies a line element that is one of the line element in at least one of the vein images and matches a line element from the other vein image, as a line element that indicates a wrinkle on the surface of the palm of the hand.

In the embodiments discussed herein, the term "verification processing" indicates processing for calculating an index that represents a level of difference or a level of similarity between the biometric information of a user and the biometric information of a registered user. The term "biometric authentication processing" is used to indicate the entire authentication processing which includes using the indexes derived in the verification processing to determine whether to authenticate the user in addition to the verification processing.

Figure 1:
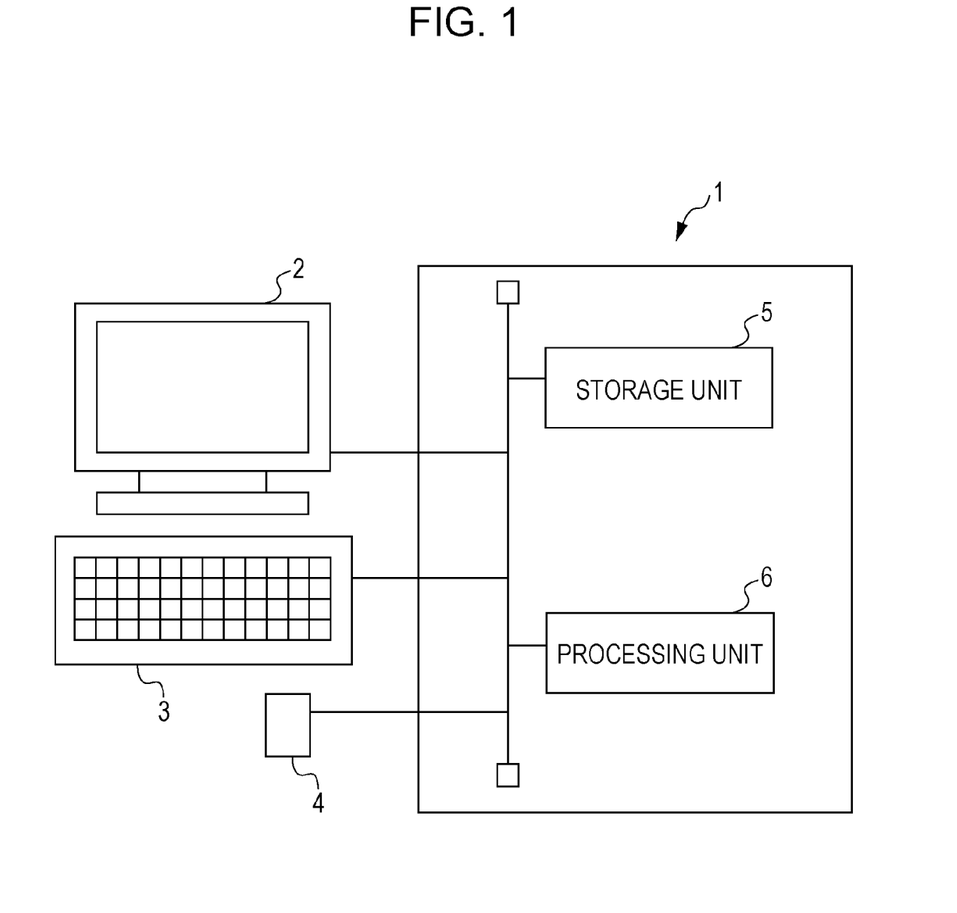
FIG. 1 is a schematic configuration of a biometric authentication device as a first embodiment of a biometric information processing apparatus.

FIG. 1 is a schematic configuration of a biometric authentication device as a first embodiment of a biometric information processing apparatus. As illustrated in FIG. 1, a biometric authentication device 1 includes a display unit 2, an input unit 3, a biometric information obtaining unit 4, a storage unit 5, and a processing unit 6. The display unit 2, the input unit 3, and the biometric information obtaining unit 4 may be provided separately from the housing that accommodates the storage unit 5 and the processing unit 6. Conversely, the display unit 2, the input unit 3, the biometric information obtaining unit 4, the storage unit 5, and the processing unit 6 may be accommodated in one housing. The biometric authentication device 1 may further include a storage medium access device (not illustrated) for accessing a storage medium such as a magnetic disc, a semiconductor memory card, or an optical storage medium. The biometric authentication device 1 may, for example, read via the storage medium access device a computer program for biometric authentication processing stored in a storage medium and executed by the processing unit 6, and execute the biometric authentication processing in accordance with the computer program.

The biometric authentication device 1 executes the biometric authentication processing by verifying a vein pattern with a vein pattern of a registered user based on a vein image that depicts the vein pattern of a hand of a user generated by the biometric information obtaining unit 4. The biometric authentication device 1 then permits the user to use the device in which the biometric authentication device 1 is mounted when the user is authenticated as a registered user as a result of the biometric authentication processing. Alternatively, the biometric authentication device 1 transmits a signal indicating that the user is authenticated to another device (not illustrated) to permit the user to use the other device.

The display unit 2 includes, for example, a display device such as a liquid crystal display. The display unit 2 displays, for example, a guidance message that indicates the imaging order for the right hand and the left hand to the user. The display unit 2 also displays a message indicating the result of the biometric authentication processing executed by the processing unit 6 or various types of information pertaining to an application.

The input unit 3 includes as a user interface, for example, a keyboard, a mouse, or a touch pad and the like. Furthermore, data, commands, or user identification information such as the user's name or a user number inputted by the user through the input unit 3, are transferred to the processing unit 6. However, the input unit 3 may be omitted when the user is not expected to input any information other than the biometric information to the biometric authentication device 1.

The biometric information obtaining unit 4 takes an image of the vein pattern of the right hand of the user from one side of the hand, for example, from the palm side of the hand, and generates a vein image of the right hand that depicts the vein pattern thereof. The biometric information obtaining unit 4 takes an image of the vein pattern of the left hand of the user from the same side as the imaging of the right hand, and generates a vein image of the left hand that depicts the vein pattern thereof. For these purposes, the biometric information obtaining unit 4 includes, for example, an illumination light source for emitting infrared light for illuminating the hands of the user, and an area sensor formed by a two-dimensional array of solid-state imaging elements having sensitivity to infrared light. The illumination light source and the area sensor are disposed so as to face the same side of the hands for example. In this case, when the user holds the palm of the hands toward the biometric information obtaining unit 4, there is generated a vein image that reflects the vein pattern of the hand of which the side of the palm is illuminated by infrared light from the illumination light source. The illumination light source and the area sensor may be disposed facing each other so that the hand of the user may be interposed therebetween. The biometric information obtaining unit 4 then outputs the vein image of the right hand and the vein image of the left hand to the processing unit 6.

The storage unit 5 includes, for example, a non-volatile semiconductor memory or a volatile semiconductor memory. The storage unit 5 stores application programs used by the biometric authentication device 1, a user name, a user identification number, and personal setting information of at least one registered user, and various types of data. The storage unit 5 further stores a program for executing the biometric authentication processing. The storage unit 5 further stores feature information for verification that indicates features of a vein pattern of at least one hand that is the biometric information of each of registered users, along with the user identification information of the each of the registered users such as the user name and/or the user identification number of the each of the registered users. The storage unit 5 may temporarily stores vein images obtained by the biometric information obtaining unit 4 and various types of data generated during the biometric information processing.

The processing unit 6 includes one or a plurality of processors and peripheral circuits thereof. The processing unit 6 obtains, from the biometric information obtaining unit 4, the vein images that reflect the vein patterns of the right hand and the left hand of a user or a registered user. The processing unit 6 executes the biometric information processing on these two vein images and extracts feature information for verification from at least one of the vein images. The processing unit 6 then executes biometric authentication processing or registration processing using the feature information for verification.

Figure 2:
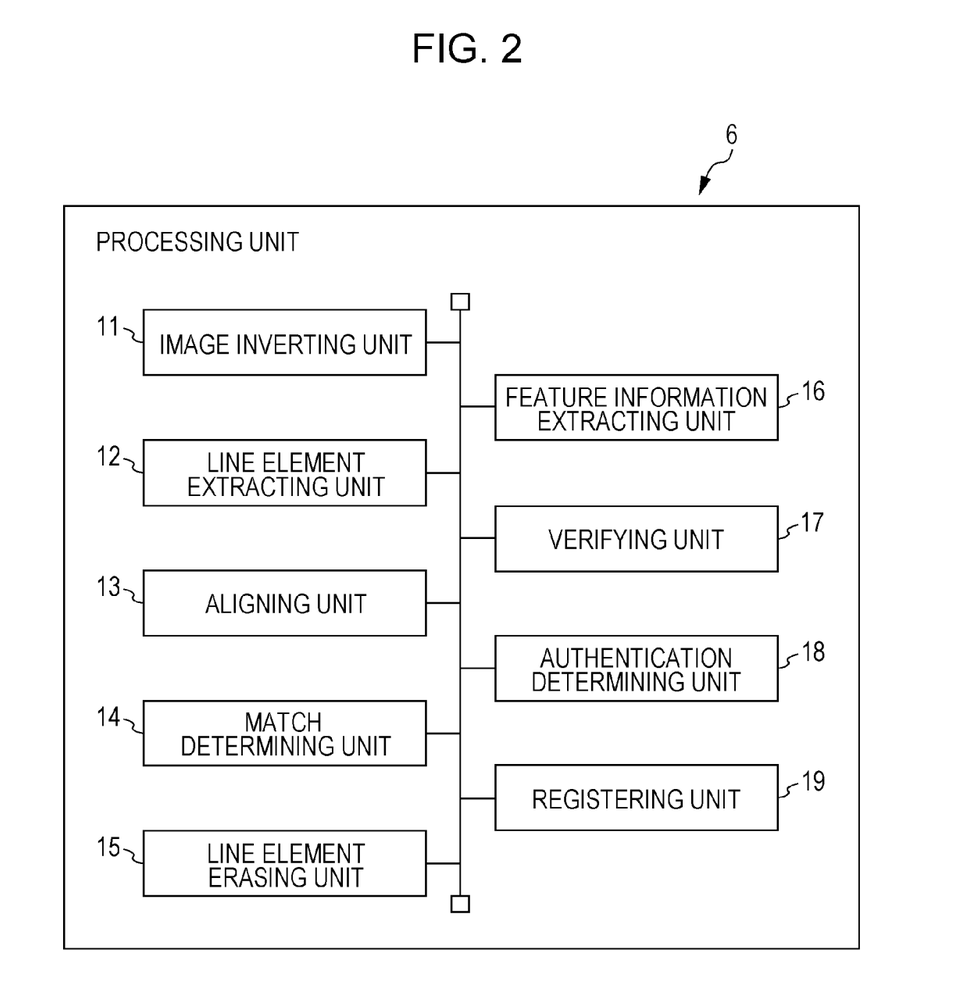
FIG. 2 is a functional block diagram of a processing unit in a biometric authentication device.

FIG. 2 is a functional block diagram of the processing unit 6. As illustrated in FIG. 2, the processing unit 6 includes an image inverting unit 11, a line element extracting unit 12, an aligning unit 13, a match determining unit 14, a line element erasing unit 15, a feature information extracting unit 16, a verifying unit 17, an authentication determining unit 18, and a registering unit 19. These units included in the processing unit 6 represent a functional module to be implemented by a computer program executed by the processor included in the processing unit 6. Alternatively, the units included in the processing unit 6 may be implemented in the biometric authentication device 1 as firmware.

The image inverting unit 11, the line element extracting unit 12, the aligning unit 13, the match determining unit 14, the line element erasing unit 15, and the feature information extracting unit 16 are used both in the biometric authentication processing and in the registration processing. The verifying unit 17 and the authentication determining unit 18 are used in the biometric authentication processing. The registering unit 19 is used in the registration processing. The processing of the units shared by both the biometric authentication processing and the registration processing will be discussed first hereinbelow.

Figure 3:
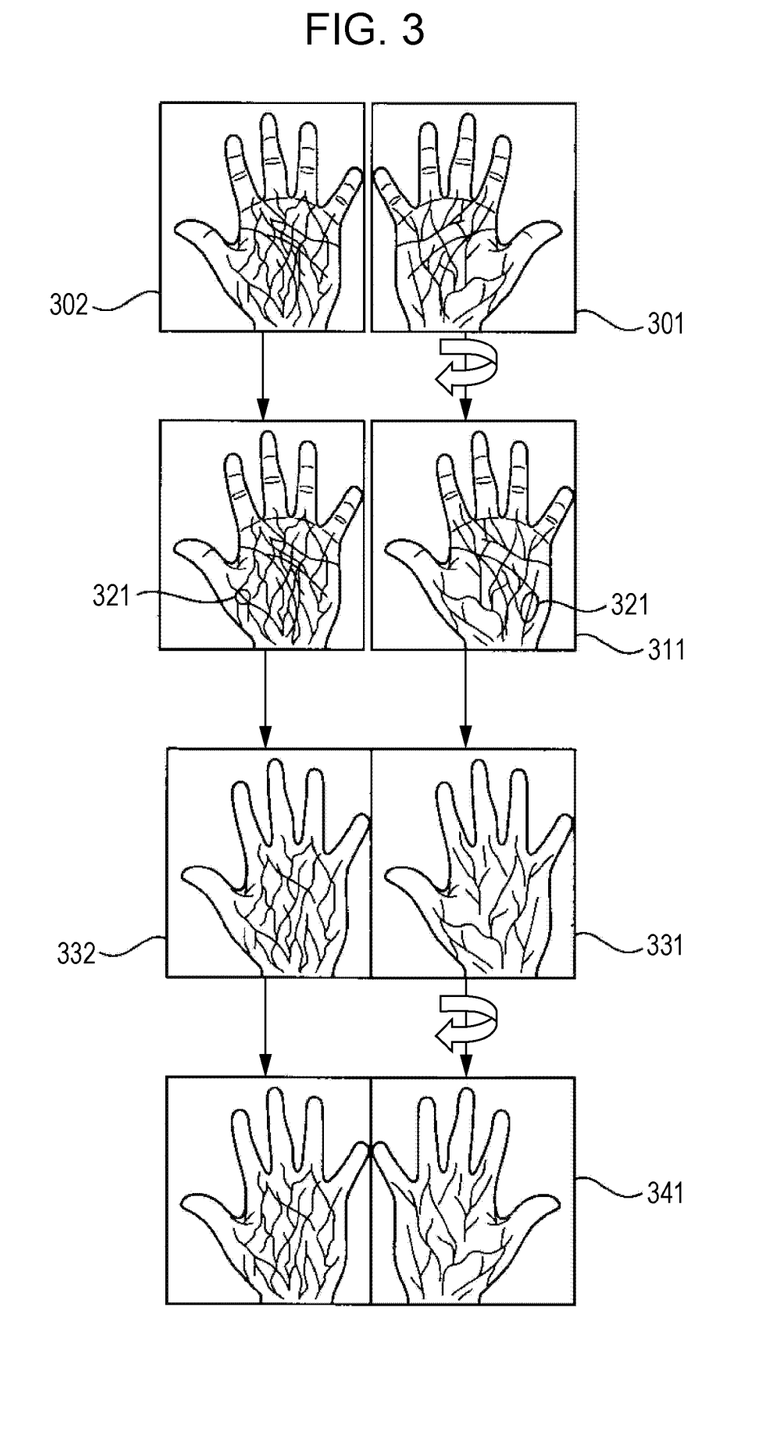
FIG. 3 is a schematic diagram of biometric information processing.

FIG. 3 is a schematic diagram of biometric information processing conducted by the image inverting unit 11, the line element extracting unit 12, the aligning unit 13, the match determining unit 14, the line element erasing unit 15, and the feature information extracting unit 16. The image inverting unit 11 creates an inverted vein image by mirror-inverting either one of a right hand vein image 301 and a left hand vein image 302 taken from the same side of the hands. In this example, the right hand vein image 301 taken from the palm side of the hand is inverted to generate an inverted vein image 311 artificially imaged from the back side of the hand. The line element extracting unit 12 then extracts line elements 321 that are portions represented by single lines from the left hand vein image 302 and the right hand inverted vein image 311. For simplification, only one line element from each of the vein images is illustrated in FIG. 3. The aligning unit 13 aligns the hand image of the left hand vein image 302 with the hand image of the right hand inverted vein image 311. The match determining unit 14 then specifies matching line elements among the line elements of the aligned left hand vein image 302 and of the right hand inverted vein image 311. The line element erasing unit 15 then erases the determined line elements as the matching line elements among the both hand images from at least one of the left hand vein image 302 and the right hand inverted vein image 311, while hereinafter it will be described the case that the determined line elements are erased from both of the left and right hand vein images 302 and 311. The feature information extracting unit 16 then extracts feature information for verification indicating the features of the vein patterns to be used for the verification processing, based on a vein image 332 and an inverted vein image 331 from which the line elements that were determined as matching between both the hand images were erased. The feature information for verification may be extracted based on a corrected vein image 341 obtained by mirror-inverting the inverted vein image 331 once again. Moreover, as discussed below, the line elements may be extracted from the vein image and the inverted image which are binarized and thinned. The line element erasing unit 15 may also erase the line elements determined as matching between the hands from the binarized and thinned vein image or the binarized and thinned inverted vein image.

The image inverting unit 11 mirror-inverts either one of the right hand vein image and the left hand vein image taken from the same side of the hands which are received from the biometric information obtaining unit 4. For example, when a vein image that reflects the vein pattern taken from the palm side of the hand is obtained by the biometric information obtaining unit 4, the vein image is mirror-inverted to become a vein pattern taken from the artificially generated back side of the hand. The image inverting unit 11 then stores the mirror-inverted vein image in the storage unit 5. As a result, even when a right hand vein image and a left hand vein image are created by taking the hand images from the same side, the hands of the two vein images may be aligned. Hereinbelow, a vein image that is mirror-inverted is referred to as an inverted vein image.

The line element extracting unit 12 extracts line elements that are a collection of pixels represented by a single line, from the vein image that is not generated as an inverted vein image and from the inverted vein image among the right hand and left hand vein images. The line elements may include curved lines as well as straight lines. Since the processing for extracting candidates of veins from vein images and the processing for extracting candidates of veins from inverted vein images are the same, the processing for extracting line elements from a vein image will be discussed hereinbelow.

The line element extracting unit 12 discriminates between an object region in which the hand of the vein image is reflected, and a background region in which the hand is not reflected. For example, when the illumination light source and the area sensor included in the biometric information obtaining unit 4 are disposed facing the same side of the hand, the luminance value of the pixels that reflect the hand is higher than the luminance value of pixels that do not reflect the hand. The line element extracting unit 12 then extracts, for example, a collection of pixels having luminance values equal to or greater than an object determination threshold, as the object region. The object determination threshold is set, for example, to a preset fixed value (e.g., 10), or to an average value of the luminance values pixels in the vein image.

Next, the line element extracting unit 12 binarizes the object region with a vein determination threshold to make a binarized vein image which includes a collection of pixels that may reflect the veins and a collection of other pixels. For example, the luminance value of the pixels in which veins are reflected is lower than the luminance value of the surrounding pixels. Accordingly, the line element extracting unit 12 determines the pixels that have luminance values equal to or greater than the vein determination threshold as pixels that may reflect veins, and determines pixels that have luminance values higher than the vein determination threshold as pixels that do not reflect veins. The vein determination threshold is set, for example, to an average value of luminance values of the pixels in the object region. Alternatively, the vein determination threshold may be determined by using the Otsu binarization method with regard to the dispersion of luminance values of the pixels in the object region. In the following explanation, a pixel in which a vein may be reflected is simply referred to as a vein candidate pixel.

The line element extracting unit 12 conducts thinning processing on the collection of vein candidate pixels in a binarized vein image to thin a line in which vein candidate pixels are linked to a line having a thickness of one pixel. The line element extracting unit 12 compares the thinned binarized vein image with a template that depicts a pattern of vein end points or vein branch points to extract end points and branch points of veins. The line element extracting unit 12 then sets the lines as line elements, where both end point of the lines are candidates of vein end points or candidates of vein branch points and are linked with the vein candidate pixels. As a result, the line element extracting unit 12 extract portions corresponding to veins in the vein image as a collection of the line elements.

In addition to the pixels that reflect veins, the luminance values of pixels that reflect wrinkles on the surface of the palm of the hand may also be lower than the luminance values of the surrounding pixels. As a result, the line elements may depict a portion of the wrinkles on the surface of the palm of the hand in place of depicting a portion of the veins.

The line element extracting unit 12 outputs, to the aligning unit 13, the thinned and binarized vein image of one of the hands, the thinned and binarized vein image of the other hand, and data of the coordinates of the vein candidate pixels included in the line elements.

The aligning unit 13 aligns a hand image on the thinned and binarized vein image of the one hand with a hand image on the thinned and binarized inverted vein image of the other hand.

In order to align the hand image on the thinned and binarized vein image of the one hand and the hand image on the thinned and binarized inverted vein image of the other hand, the aligning unit 13 calculates, for example, a normalized cross-correlation value between the vein images while changing a position of the inverted vein image of the other hand in reference to a position of the vein image of the one hand. The aligning unit 13 then derives movement amounts in the horizontal direction and in the vertical direction and a rotation angle of the inverted vein image, in relative to the inverted vein image before changed, corresponding to the maximum normalized cross-correlation value. The aligning unit 13 moves and rotates the thinned and binarized inverted vein image by the derived movements amounts and the derived rotation angle to align the hand image on the thinned and binarized vein image with the hand image on the thinned and binarized inverted vein image.

Alternatively, the aligning unit 13 may calculate the normalized cross-correlation value between the thinned and binarized vein image and the thinned and binarized inverted vein image while changing the relative positions between these vein and inverted vein images. The aligning unit 13 then may move the thinned and binarized inverted vein image in relation to the thinned and binarized vein image so that the normalized cross-correlation value thereof becomes the maximum value. The aligning unit 13 may align both hands of the vein images by moving the hand image on the thinned and binarized vein image of the one hand in relation to the hand image on the thinned and binarized inverted vein image of the other hand.

The match determining unit 14 specifies line elements in the vein image of the one hand that match line elements in the vein image of the other hand, as line elements that depict a portion of wrinkles on the surface of the palm of the hand.

In the present embodiment, the match determining unit 14 determines whether each of line elements in the thinned and binarized vein image of the one hand match any one of the line elements in the thinned and binarized inverted vein image of the other hand that is aligned. For example, the match determining unit 14 performs the following processing for each of the vein candidate pixels included in the observed line elements of the thinned and binarized vein image. The processing is to determine whether any vein candidate pixels included in the line elements determined as potentially matching in the thinned and binarized inverted vein image are present within a certain distance from any one of the vein candidate pixels included in the observed line elements. The match determining unit 14 then calculates a ratio of the number of vein candidate pixels which are present, in the thinned and binarized vein image, within the certain distance from to the vein candidate pixels of the line elements determined as potentially matching, to the total number of vein candidate pixels included in the observed line elements. When the ratio is equal to or above a certain ratio threshold, the match determining unit 14 determines that the observed line elements match the line elements that are determined as potentially matching. The certain distance is set to, for example, 1 to 3 pixels. The certain ratio threshold is set to, for example, 0.7 to 0.8.

Alternatively, the match determining unit 14 may calculate the distance between the observed line elements of the thinned and binarized vein image of the one hand and the line elements of the thinned and binarized inverted vein image of the other hand. For example, the match determining unit 14 calculates the distance between each of the vein candidate pixels included in the observed line elements and each of the vein candidate pixels included in the line elements subject to the distance calculation of the binarized inverted vein image, and then derives the minimum value of the distance among the calculated distances. The match determining unit 14 then sets the average value of the minimum values of the distances between each of the vein candidate pixels as the distance between the observed line elements and the line elements subject to the distance calculation.

The match determining unit 14 specifies, as a matching candidate line element, the line element with the minimum value of the distance among the line elements in the thinned and binarized inverted vein image of the other hand with respect to the observed line elements in the thinned and binarized vein image of the one hand. The match determining unit 14 compares the distances between the observed line elements and the matching candidate line elements to a distance determination threshold. The match determining unit 14 then determines that the observed line elements match the matching candidate line elements when the aforementioned distance is equal to or less than the distance determination threshold.

The match determining unit 14 notifies the line element erasing unit 15 of the coordinates of the vein candidate pixels included in the line elements of the binarized vein image on the one hand and determined as matching any of the line elements in the binarized inverted vein image of the other hand. In the following explanation, the line elements of the binarized vein image that are determined as matching any of the line elements of the binarized inverted vein image, are simply referred to as pseudo vein candidates.

The line element erasing unit 15 erases the pseudo vein candidates from the thinned and binarized vein image. For example, the line element erasing unit 15 generates a corrected binarized vein image by substituting values of the vein candidate pixels included in the pseudo vein candidates notified by the match determining unit 14 among the binarized vein image, with values of non-vein candidate pixels. As a result, the line elements that correspond to wrinkles on the surface of the palm of the hand are erased from the corrected and binarized vein image.

The line element erasing unit 15 transfers the corrected and binarized vein image to the feature information extracting unit 16.

The feature information extracting unit 16 derives feature information for verification depicting features of the vein patterns in the hand from the corrected and binarized vein image. The feature information for verification is used in the verification processing to determine whether the vein pattern of a user and the vein pattern of a registered user match. The feature information extracting unit 16, for example, is able to use the line elements of the corrected and binarized vein image as the feature information for verification. In this case, the feature information extracting unit 16 includes the coordinates of the vein candidate pixels included in the line elements in the feature information for verification. Alternatively, the feature information extracting unit 16 may use the corrected and binarized vein image as-is as the feature information for verification.

According to a modified example, the feature information extracting unit 16 may extract the feature information for verification from the vein image of the mirror-inverted other hand instead of extracting the feature information for verification from the hand not mirror-inverted, or the feature information extracting unit 16 may extract the feature information for verification from the vein image of the mirror-inverted other hand with extracting the feature information for verification from the hand not mirror-inverted. In this case, the line element erasing unit 15 conducts the same processing as that described above in regard to the mirror-inverted hand, to generate a corrected and binarized inverted vein image, and obtains a corrected and binarized vein image by mirror-inverting the corrected and binarized inverted vein image. The feature information extracting unit 16 may extract the feature information for verification from the corrected and binarized vein image.

The feature information extracting unit 16 transfers the feature information for verification to the verifying unit 17 when the biometric authentication processing is executed. Conversely, the feature information extracting unit 16 transfers the feature information for verification to the registering unit 19 when the registration processing is executed.

Figure 4:
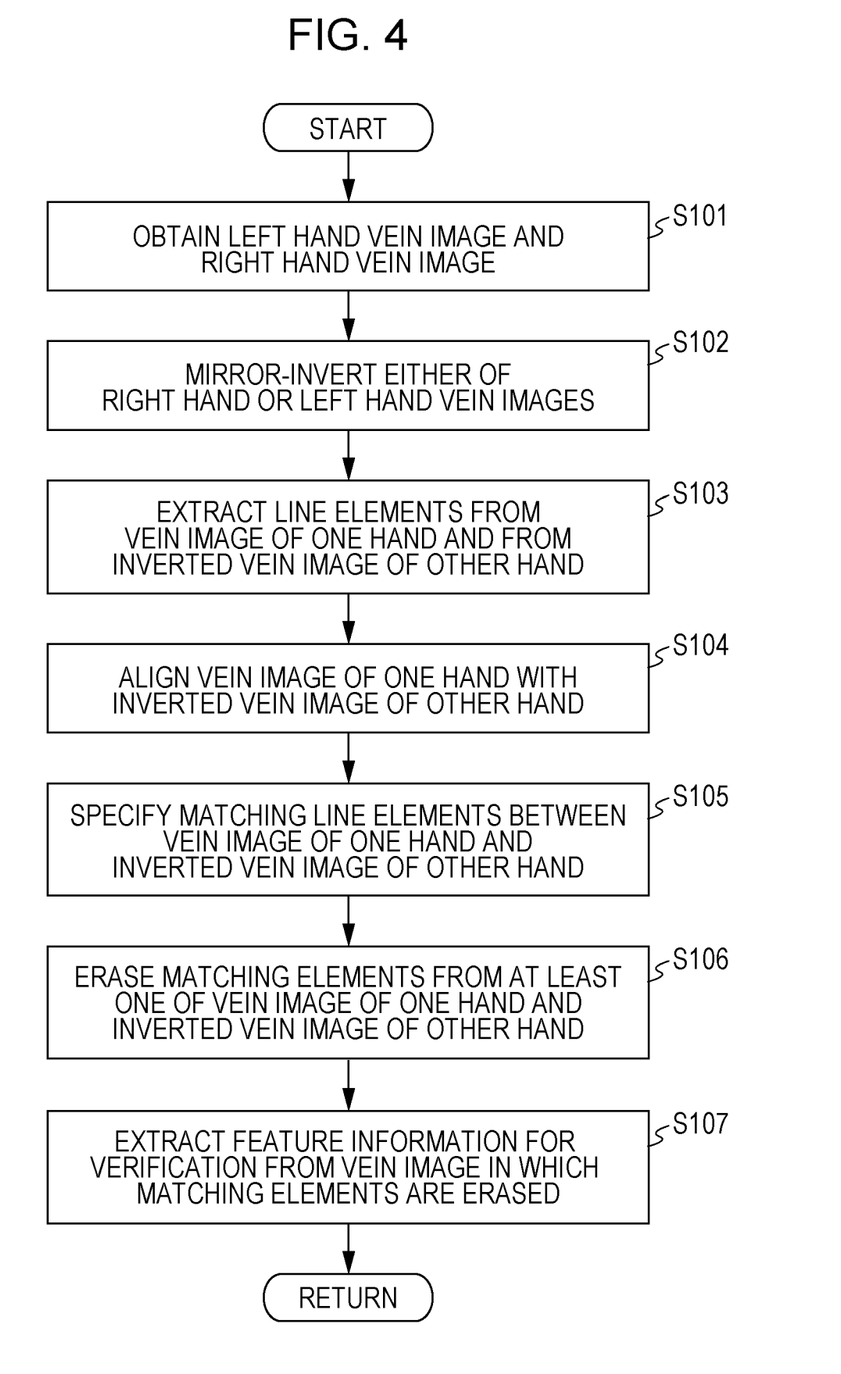
FIG. 4 is an operation flow chart of biometric information processing.

FIG. 4 is an operational flow chart of biometric information correction processing.

The processing unit 6 obtains a right hand vein image and a left hand vein image imaged from the same side of the hands from the biometric information obtaining unit 4 (step S101).

The image inverting unit 11 mirror-inverts the vein image of either the right hand or the left hand (step S102). The line element extracting unit 12 extracts line elements from the vein image of one hand and from the inverted vein image of the other hand (step S103).

The aligning unit 13 aligns the hand of the vein image of the one hand with the hand of the inverted vein image of the other hand (step S104). The match determining unit 14 specifies line elements that match among the vein image of the one hand and the inverted vein image of the other hand (step S105).

The line element erasing unit 15 erases matching line elements from at least one of the vein image of the one hand and the inverted vein image of the other hand (step S106).

The feature information extracting unit 16 extracts the feature information for verification from the vein image in which the matching line elements are erased (step S107). The processing unit 6 then finishes the biometric information processing. The feature information for verification obtained as a result of the biometric information processing is used in the biometric authentication processing or the registration processing.

(Biometric Authentication Processing)

The verifying unit 17 uses the feature information for verification of the user received from the feature information extracting unit 16 and the feature information for verification of the registered user specified by user identification information inputted via the input unit 3, to verify the vein pattern of the user and the vein pattern of the registered user. The verifying unit 17 then derives a verification score that indicates a level of similarity between the vein pattern of the user and the vein pattern of the registered user.

When a pair of coordinates of vein candidate pixels included in the line elements is included in the feature information for verification, the verifying unit 17 calculates, for example, the distances between the line elements included in the feature information for verification of the user and the line elements included in the feature information for verification of the registered user. The verifying unit 17 may calculate the distances between the line elements by, for example, conducting processing similar to the processing for calculating the distances between the line elements conducted by the match determining unit 14. The verifying unit 17 then derives the minimum value among the distances from the line elements included in the feature information for verification of the user to the line elements of the registered user, and calculates an average value of the minimum values of the distances thereof as an assessment value. The verifying unit 17 then calculates the assessment value while changing the relative position of the vein pattern of the registered user with respect to the vein pattern of the user, and uses the inverse of the minimum value of the assessment value as the verification score. However, the verification score may be set to one of the minimum value when the assessment value is less than one.

The verifying unit 17 may determine the number as an assessment value by dividing, by the total number of line elements included in the feature information for verification of the user, the number of line elements, minimum distances of which to the line elements included in the feature information for verification of the registered user are equal to or less than a certain value. The verifying unit 17 may calculate the assessment value while changing the relative position of the biometric information of the registered user with respect to the biometric information of the user, and use the maximum value of the assessment value thereof as the verification score.

When the corrected and binarized vein image is included in the feature information for verification, the verifying unit 17 calculates a normalized cross-correlation value while changing the relative positions between the corrected and binarized vein image of the user and the corrected and binarized vein image of the registered user. The verifying unit 17 may use the maximum value of the normalized cross-correlation value as the verification score.

The verifying unit 17 may calculate the verification scores by conducting the above processing for both of the hands when using the vein patterns of both hands in the verification, and then use an average value of the verification scores once again as a verification score.

The verifying unit 17 transfers the verification score and the identification information of the registered user to the authentication determining unit 18.

The authentication determining unit 18 determines that the vein pattern of the user and the vein pattern of the registered user match when the verification score is equal to or above an authentication determination threshold. The authentication determining unit 18 then authenticates the user as the registered user. The authentication determining unit 18 notifies the processing unit 6 of the authentication result when the user is authenticated.

Conversely, the authentication determining unit 18 determines that the vein pattern of the user and the vein pattern of the registered user do not match each other when the verification score is less than the authentication determination threshold. In this case, the authentication determining unit 18 does not authenticate the user. The authentication determining unit 18 notifies the processing unit 6 of the authentication result when the user authentication fails. The processing unit 6 may display a message indicating the authentication result on the display unit 2.

The authentication determination threshold is preferably set as a value so that the authentication determining unit 18 allows the authentication only when any of the actual registered users is the user. The authentication determination threshold is preferably set to a value so that the authentication determining unit 18 disallows the authentication when a person who is not registered is the user. For example, the authentication determination threshold may be a sum of the minimum value of the level of similarity and a value in which 0.7 is multiplied by the difference between the possible maximum and minimum values of the verification score.

Figure 5:
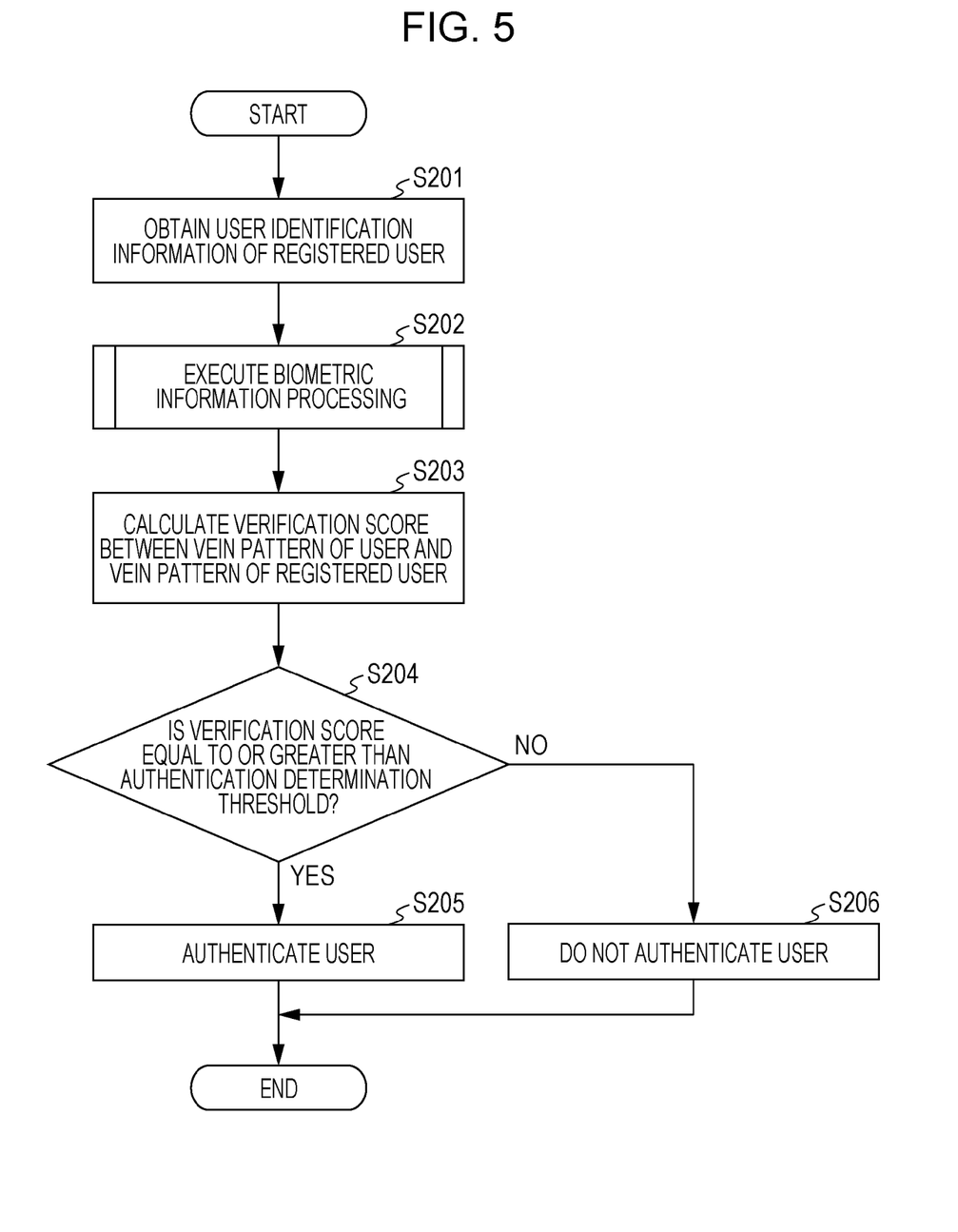
FIG. 5 is an operation flow chart of biometric authentication processing.

FIG. 5 is an operational flow chart of biometric authentication processing executed by the processing unit 6. The processing unit 6 obtains via the input unit 3 user identification information for specifying a registered user to be authenticated (step S201). The processing unit 6 receives, from the biometric information obtaining unit 4, a vein image reflecting the vein pattern of the right hand and a vein image reflecting the vein pattern of the left hand of the user who is attempting to receive authentication. The processing unit 6 extracts the feature information for verification by using the two vein images to execute the biometric information correction processing (step S202).

The verifying unit 17 reads from the storage unit 5 the feature information for verification of the registered user specified by the user identification information inputted via the input unit 3. The verifying unit 17 then calculates the verification score between the vein pattern of the user and the vein pattern of the registered user by verifying the feature information for verification of the user with the feature information for verification of the registered user (step S203).

The authentication determining unit 18 determines whether the verification score is equal to or greater than the authentication determination threshold (step S204). When the verification score is equal to or greater than the authentication determination threshold (step S204: Yes), the authentication determining unit 18 determines that the biometric information of the user and the biometric information of the registered user match. The authentication determining unit 18 then authenticates the user as the registered user (step S205). The authentication determining unit 18 notifies the processing unit 6 of the authentication result when the user is authenticated. The processing unit 6 then allows the authenticated user to use a device in which the biometric authentication device 1 is mounted or a device to which the biometric authentication device 1 is coupled.

Conversely, when the level of similarity is less than the authentication determination threshold (step S204: No), the authentication determining unit 18 determines that the biometric information of the user and the biometric information of the registered user do not match. As a result, the authentication determining unit 18 does not authenticate the user (step S206). The authentication determining unit 18 notifies the processing unit 6 that the user is not authenticated. In this case, the processing unit 6 does not allow the authenticated user to use the device in which the biometric authentication device 1 is mounted or the device to which the biometric authentication device 1 is coupled. The processing unit 6 may display a message indicating that the authentication failed on the display unit 2. The processing unit 6 finishes the biometric authentication processing after step S205 or step S206.

When a so-called 1:N authentication method is used, that is, when the user identification information of the registered user is not inputted, the verifying unit 17 derives verification each score with respect to respective the registered users. The verifying unit 17 then selects the registered user with the largest verification score. The verifying unit 17 transfers the maximum value of the verification score and the user identification information of the registered user corresponding to the maximum value, to the authentication determining unit 18. The authentication determining unit 18 authenticates the user as the registered user corresponding to the maximum value of the verification score when the maximum value of the verification score is equal to or greater than the authentication determination threshold.

(Registration Processing)

The processing unit 6 receives the vein image of the right hand and the vein image of the left hand of the user to be registered from the biometric information obtaining unit 4 in the registration processing. The processing unit 6 executes the biometric information processing on the two vein images to extract the feature information for verification from at least one of the vein images.

The registering unit 19 obtains the user name of the user to be registered from the input unit 3. The registering unit 19 sets a unique user identification number for the user. The registering unit 19 stores the user name and the user identification number of the user in the storage unit 5 along with the feature information for verification received from the feature information extracting unit 16. As a result, the user is registered as a registered user who is allowed to use the device in which the biometric authentication device 1 is mounted.

As discussed above, the biometric authentication device aligns two hand images, each of which is included in respective vein images of the right and left hand which are taken from the same side of the hands to reflect the respective vein pattern, where one of the vein images is mirror-inverted image. The biometric authentication device is able to specify line elements that depict wrinkles on the surface of the palm of the hand since line elements among the line elements extracted from one of the vein images that match line elements extracted from the vein image of the other hand are detected. Excluding the specified line elements, the biometric authentication device then derives feature information for verification. As a result, since information related to the wrinkles on the surface of the palm of the hand reflected in the vein images is less likely to be included in the feature information for verification, the biometric authentication device is able to alleviate a reduction in authentication accuracy due to the wrinkles on the surface of the palm of the hand reflected in the vein images.

Next, a biometric information processing apparatus according to a second embodiment will be explained. The biometric information processing apparatus adjusts a weighting factor used in the verification score calculations and set for each line element, in accordance with distances between the line elements of one hand and the line elements of the other hand.

Figure 6:
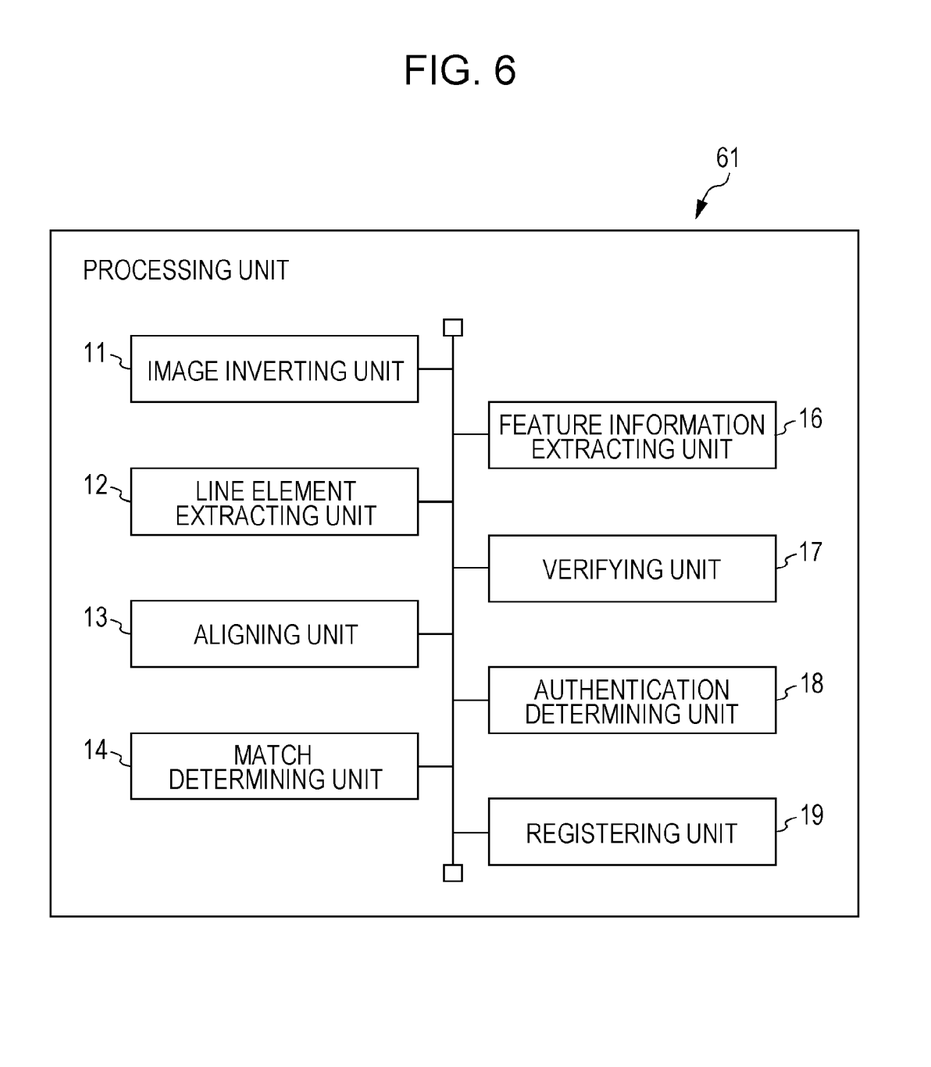
FIG. 6 is a functional block diagram of a processing unit in a biometric authentication device according to a second embodiment.

FIG. 6 is a functional block diagram of a processing unit 61 in a biometric authentication device according to a second embodiment that is another example of the biometric information processing apparatus. As illustrated in FIG. 6, the processing unit 61 includes an image inverting unit 11, a line element extracting unit 12, an aligning unit 13, a match determining unit 14, a feature information extracting unit 16, a verifying unit 17, an authentication determining unit 18, and a registering unit 19.

The biometric authentication device according to the second embodiment differs from the biometric authentication device according to the first embodiment in that the processing unit 61 does not include a line element erasing unit and also the processing conducted by the feature information extracting unit 16 and the verifying unit 17. The following is an explanation of the feature information extracting unit 16, the verifying unit 17, and related portions. The other constituent elements of the biometric authentication device may be referred to in the explanations of the constituent elements corresponding to the first embodiment.

The match determining unit 14 outputs a determination result indicating whether the line elements of the vein image used for deriving the feature information for verification match the line elements of the other vein image, and the coordinates of the vein candidate pixels included in the line elements, to the feature information extracting unit 16.

The feature information extracting unit 16 uses the coordinates of the vein candidate pixels included in the line elements of the vein image for deriving the feature information for verification as the feature information for verification. Moreover, the feature information extracting unit 16 sets a weighting factor for verification to be used in the verification processing for the line elements of the vein image for deriving the feature information for verification. For example, the feature information extracting unit 16 reduces the weighting factor of the line elements of the vein image for deriving the feature information for verification that are determined as matching the line elements of the other vein image, to be less than a weighting factor of line elements that are determined as not matching line elements of the other vein image. As a result, the biometric authentication device is able to reduce any effects on the verification score caused by line elements that are highly likely to be wrinkles on the surface of the palm of the hand.

According to a modified example, the match determining unit 14 may function as a distance calculating unit and may calculate the smallest distance between the line elements in the vein image for deriving the feature information for verification and the line elements of the other vein image as the distance to the nearest line elements in the other vein image. The match determining unit 14 may output the coordinates of the vein candidate pixels included in the line elements, and the smallest values of the distances thereof, to the feature information extracting unit 16.

In this case, the feature information extracting unit 16 may set the weighting factor in accordance with the following formula, for example, to reduce the weighting factor accordingly as the minimum value of the distance becomes smaller.

$$w_i = \begin{cases} d_i/\alpha & (d_i \leq \alpha) \\ 1 & (d_i > \alpha) \end{cases} \qquad (1)$$

In the equation, $w_i$ is a weighting factor for the ith line element; $d_i$ is the smallest distance of the ith line element to a line element in the other vein image; $\alpha$ is a constant number and is set, for example, at a minimum value of the smallest distance between two line elements considered to depict different veins, that is, is set at 5 to 10. The feature information extracting unit 16 is able to correspondingly reduce the effect on the verification score as the likelihood increases of a line elements being wrinkles on the surface of the palm of the hand.

The feature information extracting unit 16 transfers the feature information for verification and the weighting coefficients of the line elements to the verifying unit 17 when the biometric authentication processing is executed. The feature information extracting unit 16 transfers the feature information for verification and the weighting coefficients of the line elements to the registering unit 19 when the registration processing is executed.

Figure 7:
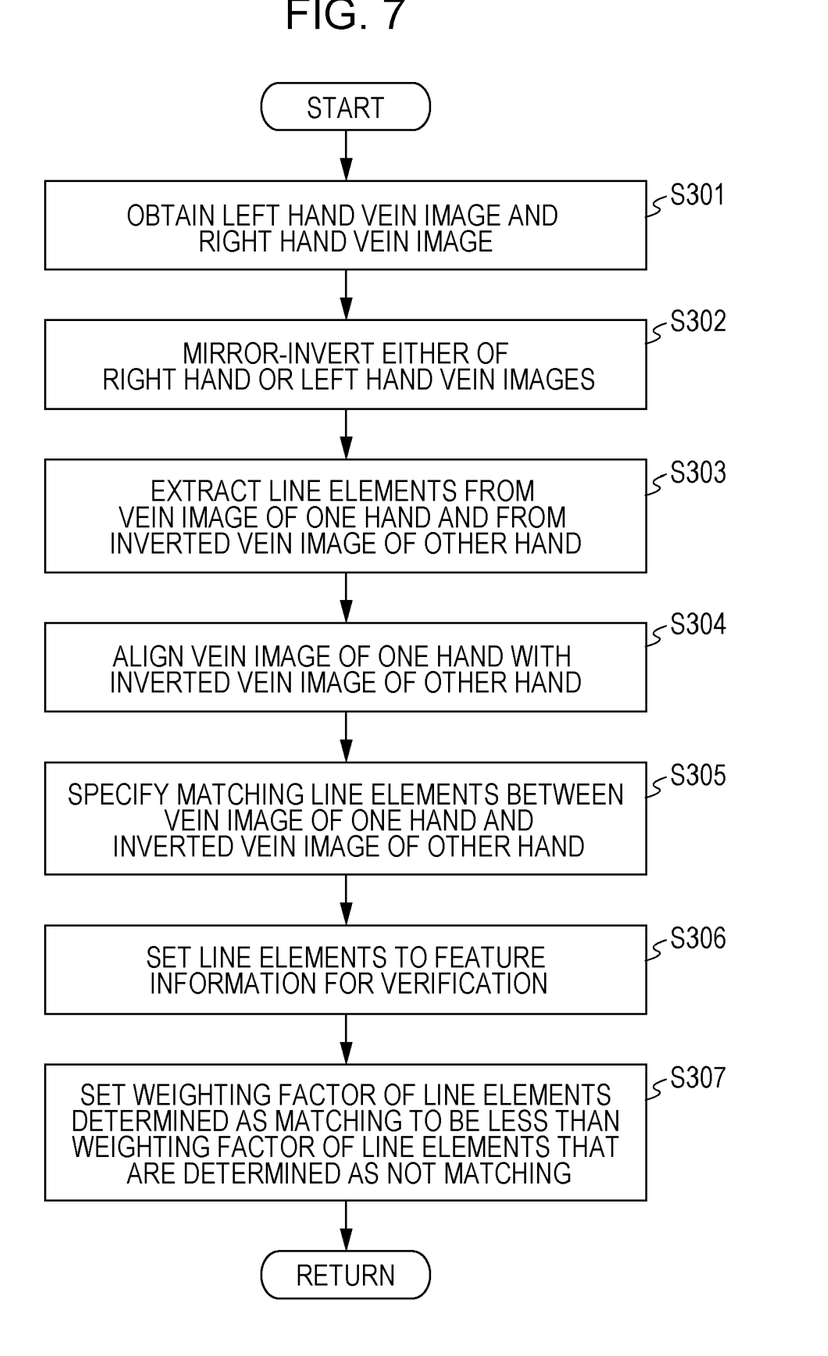
FIG. 7 is an operation flow chart of biometric authentication processing according to the second embodiment.

FIG. 7 is an operational flow chart of biometric information correction processing according to the second embodiment.

The processing unit 6 obtains a right hand vein image and a left hand vein image imaged from the same side of the hands by the biometric information obtaining unit 4 (step S301).

The image inverting unit 11 mirror-inverts the vein image of either the right hand or the left hand (step S302). The line element extracting unit 12 extracts line elements from the vein image of one hand and from the inverted vein image of the other hand (step S303).

The aligning unit 13 aligns the hand of the vein image of the one hand with the hand of the inverted vein image of the other hand (step S304). The match determining unit 14 specifies line elements that match among the vein image of the one hand and the inverted vein image of the other hand (step S305).

The feature information extracting unit 16 sets the line elements to the feature information for verification (step S306). The feature information extracting unit 16 sets the weighting factor of the line elements determined as matching lower than the weighting factor of the line elements determined as not matching (step S307). The processing unit 6 then finishes the biometric information processing. The feature information for verification obtained as a result of the biometric information processing is used in the biometric authentication processing or the registration processing.

The verifying unit 17 uses, as an assessment value S, a weighted average of the minimum values of the distances of the line element included in the feature information for verification of the registered user with regard to the line elements included in the feature information for verification of the user.

$$S = \Sigma(d_{ij} \cdot w_i \cdot w_j)/\Sigma(w_i \cdot w_j) \qquad (2)$$

In the equation, $d_{ij}$ indicates a distance from the ith line element of a hand of the user to the jth line element of the registered user when the distance between the ith and jth line elements is smallest; $w_i$ is a weighting factor for the ith line element of the user; $w_j$ is a weighting factor for the jth line element of the registered user.

All of the line elements of the hands of the user may be set to $w_i=1$ when the weighting factor for the vein image obtained at registration has been calculated. All of the line elements of the hands of the registered user may be set to $w_j=1$ when the weighting factor for the vein image obtained at biometric authentication has been calculated.

The verifying unit 17 calculates the assessment value according to equation (2) while changing the relative position of the biometric information of the registered user with respect to the biometric information of the user, and uses the inverse of the minimum value of the assessment value as the verification score.

According to the second embodiment, the biometric information processing apparatus reduces the weighting coefficients of line elements that have a higher likelihood of reflecting wrinkles on the surface of the palm of the hand among the line elements, to be lower than the weighting coefficients of the other line elements. As a result, the biometric information processing apparatus is able to alleviate a reduction in authentication accuracy due to wrinkles on the surface of the palm of the hand since any effect on the verification results from the line elements having a high likelihood of reflecting wrinkles on the surface of the palm of the hand may be reduced.

Due to the configuration of the biometric information obtaining unit 4, wrinkles on the surface of the palm of the hand may be depicted as line elements in the vein image even in a vein image imaged by the biometric information obtaining unit 4 from the back side of the hand. In this case, the match determining unit 14 may specify, among a plurality of line elements of a vein image of at least one hand, line elements that match line elements of the vein image of the other hand based on the vein image of the one hand imaged from the back of the hand and the vein image of the other hand imaged from side of the palm of the hand. In this case, the image inverting unit may be omitted.

According to another modified example, the line element extracting unit 12 may extract the line elements from the vein images before conducting the mirror-inverting from both hands even when the same side of both hands are imaged. In this case, the image inverting unit 11 may derive the coordinates of the vein candidate pixels included in the line elements of the mirror-inverted vein images when mirror-inverting the vein image of one hand.

According to yet another modified example, the biometric information processing apparatus may include only one of the registering unit, the verifying unit, and the authentication determining unit.

Figure 8:
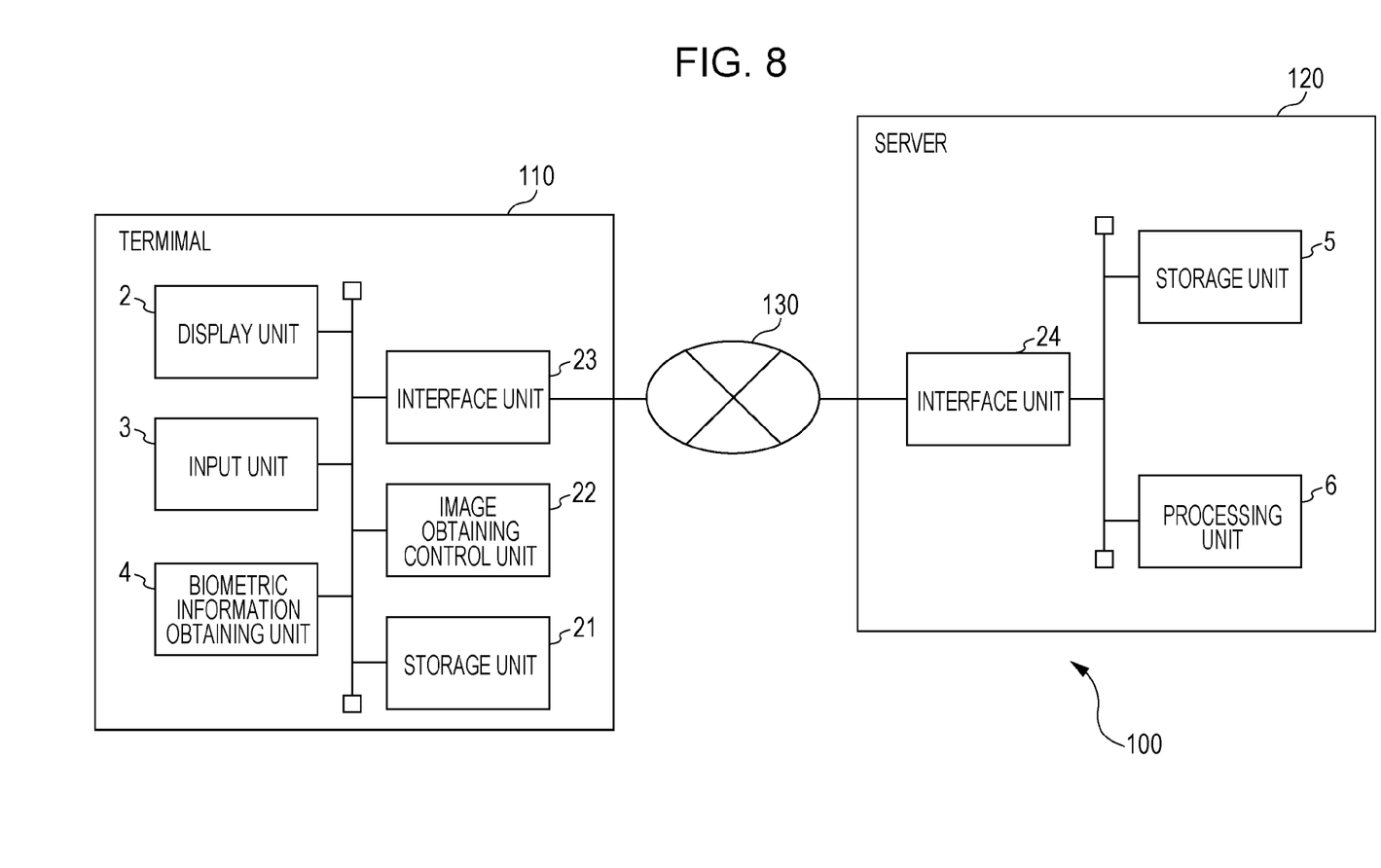
FIG. 8 is a schematic configuration of an example of a computer system having mounted therein a biometric information processing apparatus according to the embodiments or according to the modified examples.

FIG. 8 is a schematic configuration of an example of a computer system having mounted therein the biometric information processing apparatus according to the embodiments or according to the modified examples.

For example, a computer system 100 includes at least one terminal 110 and a server 120. The terminal 110 and the server 120 are coupled over a wired or wireless communication network 130. Reference numbers that are the same as the reference numbers of the constituent elements included in the biometric authentication device 1 are assigned to the constituent element corresponding to any of the constituent elements included in the biometric authentication device 1 illustrated in FIG. 1 among the constituent elements included in the computer system 100 in FIG. 8.

The terminal 110 in the system is, for example, a terminal installed in a fixed manner, and includes the display unit 2, the input unit 3, and the biometric information obtaining unit 4. Moreover, the terminal 110 includes a storage unit 21, an image obtaining control unit 22, and an interface unit 23.

The storage unit 21 includes, for example, a semiconductor memory circuit and temporarily stores the right and left vein images generated by the biometric information obtaining unit 4. The image obtaining control unit 22 includes one or a plurality of processors and peripheral circuits, and controls the units of the terminal 110 and executes various types of programs operated by the terminal 110. The image obtaining control unit 22 transmits the right hand and left hand vein images generated by the biometric information obtaining unit 4 to the server 120 via the interface unit 23 which includes an interface circuit for connecting the terminal 110 to the communication network 130. The image obtaining control unit 22 may also transmit user identification information inputted via the input unit 3 to the server 120.

The server 120 includes the storage unit 5, the processing unit 6, and an interface unit 24 including an interface circuit for connecting the server 120 to the communication network 130. The processing unit 6 in the server 120 uses the right hand and left hand vein images received via the interface unit 24 to execute the biometric information processing, the biometric authentication processing, and the registration processing by realizing the functions of the units included in the processing unit according to any of the embodiments or the modified examples. The server 120 sends back a determination result indicating whether the authentication was successful or not to the terminal 110 via the interface unit 24 when the biometric authentication processing is executed.

Alternatively, the image obtaining control unit 22 of the terminal 110 may execute the processing of the image inverting unit 11, the line element extracting unit 12, the aligning unit 13, the match determining unit 14, the line element erasing unit 15, and the feature information extracting unit 16 among the functions of the units according to the above embodiments. In this case, the feature information for verification extracted from the vein image of the user and the identification information of the user may be transmitted from the terminal 110 to the server 120. Accordingly, the processing unit 6 of the server 120 executes only the processing of the verifying unit 17, the authentication determining unit 18, and the registering unit 19 among the functions of the processing unit according to the above embodiments. As a result, since the load on the server 120 is reduced, the computer system 100 is able to suppress a waiting time for the user even when biometric authentication processing is executed multiple times at the same time.

A computer program including commands to cause the computer to execute the functions of the processing units according to the above embodiments may be supplied in the form of being recorded on a recording medium such as a magnetic recording medium, an optical recording medium, or a non-volatile semiconductor memory. Carrier waves are not included in a computer-readable storage medium.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A biometric information processing apparatus comprising:
an aligning unit that aligns a hand image in a first vein image that includes a vein pattern of one hand among a right hand and a left hand as seen from one side of a palm side of the hand or a back side of the hand, with a hand image in a second vein image that includes a vein pattern of the other hand among the right hand and the left hand as seen from the other side among the palm side of the hand or the back side of the hand; and
a match determining unit that determines a line element, among a plurality of line elements in the first vein image, that matches any of a plurality of line elements in the second vein image.

2. The biometric information processing apparatus according to claim 1, further comprising:
a feature information extracting unit that sets the plurality of line elements in the first vein image as feature information for verification, and that sets a verification weighting factor pertaining to a line element, among the plurality of line elements of the first vein image, that matches any of the plurality of line elements of the second vein image, to be lower than a verification weighting factor pertaining to a line element, among the plurality of line elements of the first vein image, that does not match any of the plurality of line elements of the second vein image.

3. The biometric information processing apparatus according to claim 2, further comprising:
a verifying unit that calculates a verification score of the plurality of line elements included in the feature information for verification of a user by taking a weighted average of distances from the line elements to matching candidate line elements which are nearest line elements among the plurality of line elements included in the feature information for verification of a registered user, the weighted average based on the weighting factor corresponding to the line elements or the weighting factor of the matching candidate line elements; and
an authentication determining unit that determines whether to authenticate the user as the registered user in accordance with the verification score.

4. The biometric information processing apparatus according to claim 1, further comprising:
a line element erasing unit that erases line elements, among the plurality of line elements of the first vein image, that match any of the plurality of line elements in the second vein image; and
a feature information extracting unit that extracts feature information for verification based on line elements other than the erased line elements among the plurality of line elements of the first vein image.

5. The biometric information processing apparatus according to claim 1, further comprising:
an image inverting unit that generates the second vein image by mirror-inverting a vein image that is the vein pattern of the other hand as seen from the one of the sides.

6. The biometric information processing apparatus according to claim 1, further comprising:
a line element extracting unit that extracts a region that reflects a hand in the first vein image, extracts pixels having a luminance value equal to or less than a certain threshold, and extracts, from a line in which the extracted pixels are linked, a plurality of portions of the lines between a branch point or an end point as the line elements.

7. The biometric information processing apparatus according to claim 1, wherein:
the match evaluating unit calculates minimum values of distances from pixels included in a first line element among the plurality of line elements in the first vein image to pixels included in a second line element among the plurality of line elements in the second vein image, and uses an average value of the minimum values as a distance between the first line element and the second line element, and when the distance between the first line element and the second line element is equal to or less than a certain threshold, determines that the first line element and the second line element match.

8. The biometric information processing apparatus according to claim 1, wherein:
the match determining unit derives a sum of the number of pixels of which a distance from pixels included in a first line element among the plurality of line elements in the first vein image to any pixels included in a second line element among the plurality of line elements in the second vein image is equal to or less than a certain distance threshold, and when a ratio of the sum with respect to a total number of pixels included in the first line element is equal to or greater than a certain ratio threshold, determines that the first line element and the second line element match.

9. A biometric information processing apparatus comprising:
an aligning unit that aligns a hand of a first vein image that includes a vein pattern of one hand among a right hand and a left hand as seen from one side of a palm side of the hand or a back side of the hand, with a hand of a second vein image that includes a vein pattern of the other hand among the right hand and the left hand as seen from the other side among the palm side of the hand or the back side of the hand; and
a distance calculating unit that calculates a distance from a plurality of line elements in the first vein image to nearest line elements among a plurality of line elements in the second vein image; and
a feature information extracting unit that uses the plurality of line elements in the first vein image as feature information for verification, and sets a verification weighting factor so that the plurality of line elements in the first vein image becomes correspondingly smaller as the distance to the nearest line elements among the plurality of line elements in the second vein image decreases.

10. A biometric information processing method, comprising:
aligning a hand of a first vein image that includes a vein pattern of one hand among a right hand and a left hand as seen from one side of a palm side of the hand or a back side of the hand, with a hand of a second vein image that includes a vein pattern of the other hand among the right hand and the left hand as seen from the other side among the palm side of the hand or the back side of the hand; and
specifying a line element, among a plurality of line elements in the first vein image, that matches any of a plurality of line elements in the second vein image.

* * * * *